US006965876B2

(12) United States Patent
Dabbiere

(10) Patent No.: US 6,965,876 B2
(45) Date of Patent: *Nov. 15, 2005

(54) METHODS AND DEVICES UTILIZING A TRACKING SYSTEM

(75) Inventor: Alan J. Dabbiere, Atlanta, GA (US)

(73) Assignee: Manhattan Associates, Inc., Atlanta, GA (US)

( * ) Notice: Subject to any disclaimer, the term of this patent is extended or adjusted under 35 U.S.C. 154(b) by 932 days.

This patent is subject to a terminal disclaimer.

(21) Appl. No.: 09/733,600

(22) Filed: Dec. 8, 2000

(65) Prior Publication Data

US 2002/0072960 A1 Jun. 13, 2002

Related U.S. Application Data

(63) Continuation of application No. 08/563,265, filed on Nov. 27, 1995, now Pat. No. 6,226,622.

(51) Int. Cl.$^7$ ............................................. G06F 19/00
(52) U.S. Cl. ..................... 705/28; 340/825.49; 340/988; 700/90; 705/11
(58) Field of Search ..................... 705/28, 11; 701/207, 701/213

(56) References Cited

U.S. PATENT DOCUMENTS

| 4,688,026 A | * | 8/1987 | Scribner et al. ............ 235/385 |
| 5,014,206 A | * | 5/1991 | Scribner et al. ............ 701/207 |
| 5,428,546 A | * | 6/1995 | Shah et al. ................. 701/207 |
| 5,541,845 A | * | 7/1996 | Klein ......................... 701/207 |
| 5,557,553 A | * | 9/1996 | Sellie, Sr. .................. 702/176 |
| 5,586,030 A | * | 12/1996 | Kemner et al. .............. 701/23 |
| 5,610,815 A | * | 3/1997 | Gudat et al. ................ 701/23 |
| 5,629,981 A | * | 5/1997 | Nerlikar .................... 713/168 |
| 6,604,005 B1 | * | 8/2003 | Dorst et al. ................. 700/56 |

FOREIGN PATENT DOCUMENTS

JP 06082262 A * 3/1994 ........... G01C/21/00

OTHER PUBLICATIONS

Sumpter, Carl; Asher, Gregory, "GPS Goes Real Time", Sep. 1994, Civil Engineering, v64n9, p. 64.*

* cited by examiner

Primary Examiner—Tariq R. Hafiz
Assistant Examiner—Jonathan G Sterrett
(74) Attorney, Agent, or Firm—Morris, Manning & Martin, LLP

(57) ABSTRACT

A method and system which tracks productivity including summarization of "tasks performed" for productivity analysis. The tracking capabilities of the system uses a positioning system and includes a complete reconstruction (graphically if desired by overlaying the positional movements on a 2 or 3 dimensional map of the location) of a series of movements over a period of time. The system gathers the exact time and position information of an employee over a period of each work day and the task being worked on at any given moment of time. This data can be analyzed to determine, for example, non-productive movements, and provide a better foundation of information for productivity payroll including the relative "difficulty" of a task.

14 Claims, 2 Drawing Sheets

METHODS AND DEVICES UTILIZING A TRACKING SYSTEM

CROSS REFERENCE TO RELATED APPLICATIONS

This a continuation of application Ser. No. 08/563,265 filed on Nov. 27, 1995 now U.S. Pat. No. 6,226,622, naming Alan J. Dabbiere as inventor.

TECHNICAL FIELD

The present invention relates to devices and methods for tracking movement of moving objects such as people and equipment to track and determine productivity in a warehouse or the like, employing global positioning system (GPS). The present invention also relates to a devices and methods of tracking the activities (such as assigned tasks) of people to track and determine productivity in a warehouse or the like, employing a GPS. The present invention also relates to devices and methods of providing improved security and/or visitor tracking.

BACKGROUND OF THE INVENTION

People normally perform specific tasks as directed by supervisor personnel in a warehouse setting. In a more modem warehouse, such tasks are computer-generated. Productivity, especially employee productivity is determined by analyzing the tasks performed over time. There are limitations to the various aspects of these methods. There is a great need for a way to obtain precise information regarding movement, activity and current location of individuals and/or equipment and utilize such information to improve the warehouse efficiency.

SUMMARY OF THE INVENTION

The system of the present invention will gather exact time, activity and position information of an employee over a period of each work day and the task being worked on at that moment. These data can be analyzed to determine, for example, non-productive movements, and provide a better foundation of information for productivity payroll including the relative 'difficulty' of a task.

It is therefore an object of the present invention to provide a method to track movement and activity of objects and individuals to analyze methods for improvement and creation of improved methods resulting from this tracking. It is a further object of the present invention to provide a method to graphically recreate position and activity over a period of time (in faster or slower than actual time) for analysis and review purposes. It is still a further object of the present invention to provide a method to track equipment movement to better determine repair/maintenance intervals. It is still a further object of the present invention to provide a method to use such data to perform more sophisticated incentive pay capabilities in an incentive pay environment. It is still a further object of the present invention to provide a method to use such data to provide improved security and safety policies and the like and to track and enforce such policies.

The method of tracking movement of a moving object to track and determine productivity of the present invention comprises the steps of: receiving a current position of said object via a global positioning system (GPS) signal; obtaining data including the current position and activity of the object; repeating the receiving and obtaining steps for a period of time to create positional movements and the activities for the period of time; overlaying the positional movements and the activities on a two or three dimensional map for the period of time; analyzing the positional movements and the activities of the map for the period of time; and determining the productivity of the object from the analyzed positional movements and the activities.

The method of the present invention includes the steps of: determining difficulty of the activities from the analyzed activities; and determining pay incentives. Additionally, the method includes determining non-productive movements and assigning the object to a next task based on the current position.

The method of the present invention further includes the steps of: learning a best method of performing the activities in an operation; and creating a computer simulation model identifying or predicting the best method based on a past performance of the operation.

The system of tracking movement of moving objects of the present invention includes: a plurality of devices, each device being associated with a respective moving object and adapted to receive a current position via a global positioning system (GPS) signal and transmit data including the current position and an activity of the object; and a host computer obtaining the data for a period of time to create positional movements and activities of the object for the period of time and overlaying the positional movements and the activities on a two or three dimensional map for the period of time for the basis of determining the productivity of the object from the positional movements and the activities.

The devices are selected from the set of a portable data terminal and a badge wherein the portable data terminal and the badge comprise: a radio frequency transmitter to transmit the data; and, a global positioning system (GPS) receiver.

The system of the present invention further includes: means for learning a best method of performing the activities in an operation; and means for creating a computer simulation model identifying or predicting a best method based on a past performance of the operation.

DESCRIPTION OF THE INVENTION

Figure 3:
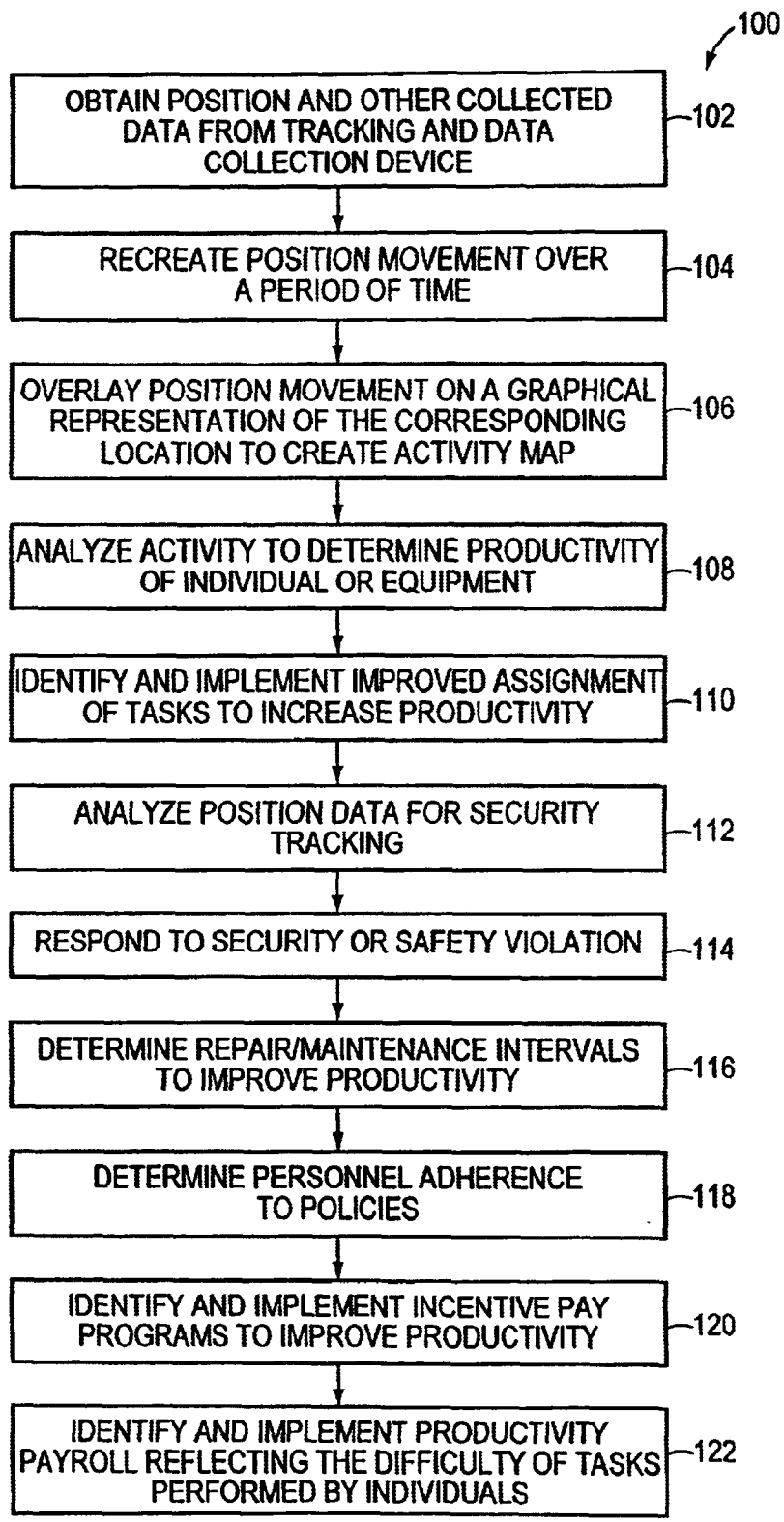
FIG. 3 illustrates the method of the present invention.

Referring now to FIG. 3, the current ability to track productivity includes summarization of 'tasks performed' for productivity analysis (Step 108). With the improved tracking capabilities provided using a global positioning system (hereinafter 'GPS'), a complete reconstruction (graphically if desired by overlaying the positional movements on a 2 or 3 dimensional map of the location) of a series movements over a period of time can be analyzed (Step 106).

Figure 1:
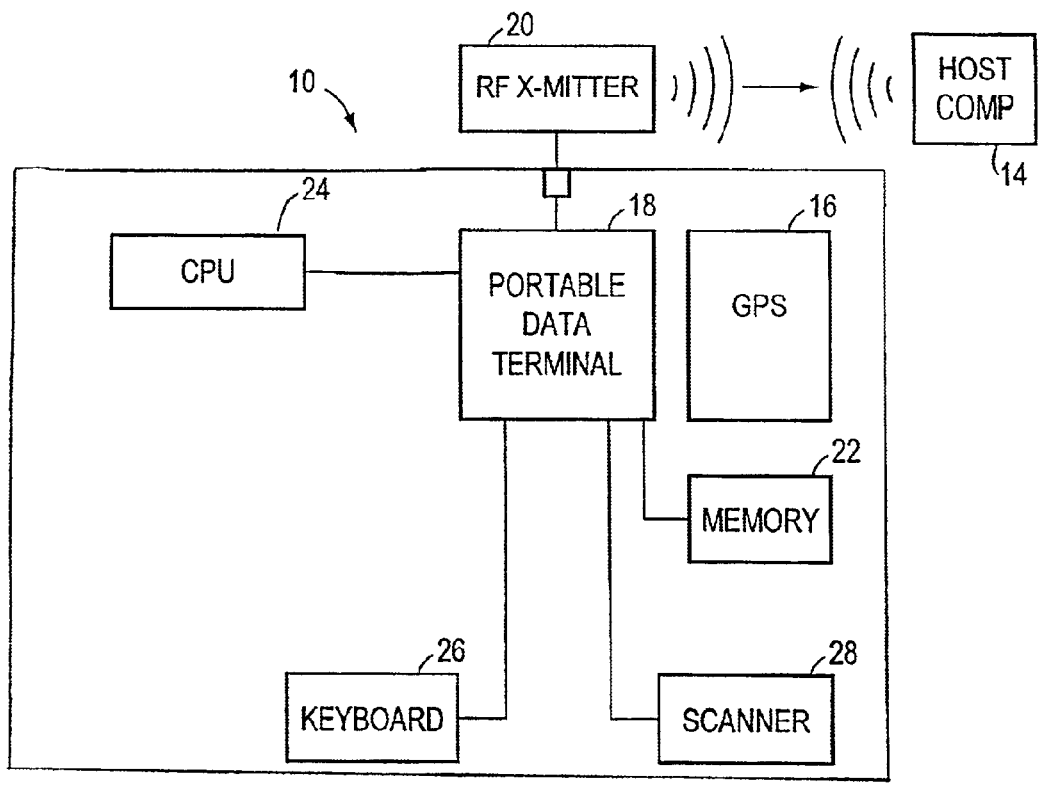
FIG. 1 illustrates the system of the present invention including a portable data terminal.

Referring also to FIG. 1, the system 10 of the present invention will gather exact time and position information of an employee over a period of each work day and the task being worked on at any given moment of time (Step 102). These data can be analyzed to determine, for example, non-productive movements, and provide a better foundation of information for productivity payroll including the relative 'difficulty' of a task (Step 122). It is envisioned that this method 100 can be used in a warehouse, office or any location where there is a need to determine information such as productivity of an individual or equipment (Step 108). It is further envisioned that such a method 100 can be used to track the identity and location of visitors and/or employees around a particular site.

In addition to the analysis of this information for productivity tracking and methods analysis, this information could be used for security tracking (Step 112) if the individual is entering areas of the building that are not required to fulfill the requirements of the tasks assigned, or if safety issues arise.

The system 10 can be integrated into a neural network of information that could 'learn' the best methods of performing tasks to create computer simulation models that identify or predict better operations by collecting and analyzing a stream of data regarding past performance.

This method 100 has the ability to track the movement of objects and individuals to analyze methods for improvement and creation of improved methods and to graphically recreate position and activity over a period of time (in faster or slower than actual time) for analysis and review purposes (Step 104). This method 100 also provides the ability to track equipment movement to better determine repair/maintenance intervals (Step 116) and to use data to perform more sophisticated incentive pay capabilities (Step 120) in an incentive pay environment. This method 100 also provides the ability to analyze movement data for security, safety, and adherence to policy purposes (Step 118) and to constantly monitor the current position of equipment and employees in the warehouse to provide a better source of data for assignment of each next task to the equipment/employee in an automated warehouse environment where the warehouse management system assigns each task to each employee (Step 110).

The proposed device integrates the devices and the functionalities of a basic portable data terminal 18 (radio frequency or batch mode) and a GPS location identification system 16.

The portable data terminal 18 functions typically include data collection through key entry 26 or an integrated bar coding scanner 28, execute programs through the use of an internal CPU 24, store data through internal computer memory 22 and/or disk storage, export collected data, and execute/transmit data from an external computer through radio-frequency communications via transmitter 20. Suitable examples of handheld devices incorporating these functions are fully described in U.S. Pat. No. 4,621,189 to Kumar et al., issued Nov. 4, 1986, which is incorporated herein by reference.

The combined device would have the standard capabilities to direct employees to tasks, and collect and transmit data to a host computer 14, or act as a computer terminal for programs executing on the host and would in addition transmit position data to the host computer 14 at specific time intervals.

This improvement of the existing capability of the devices is that the constant information of location of the device would be used by the host computer 14 to provide better employee tracking capabilities, and assignment of tasks to the individual which is not currently possible.

Figure 2:
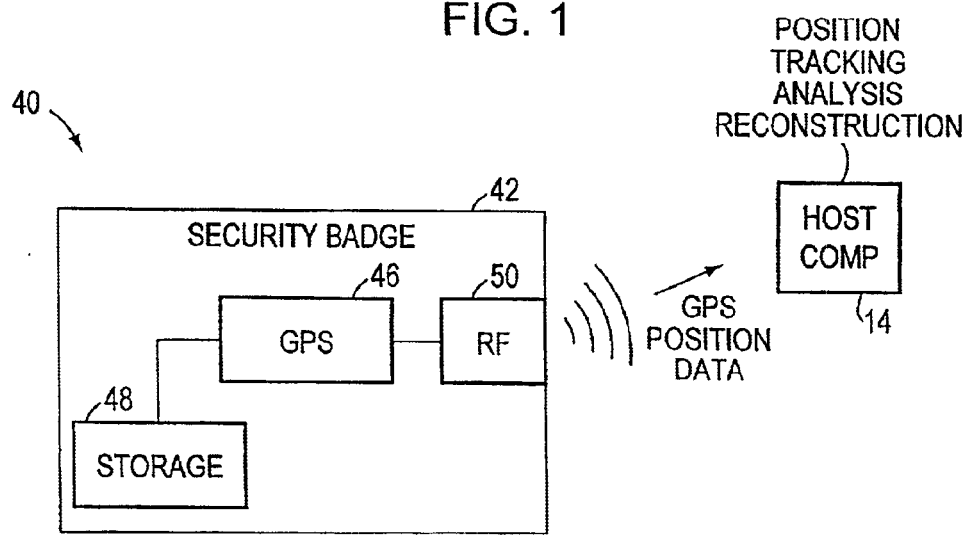
FIG. 2 illustrates the system of the present invention including a security badge.

Referring now to FIG. 2, device 40 integrates any standard employee/visitor security badge 42 with a GPS location sensor 46 and transmitter 50 or data collection device. The purpose of device 40 is to provide better tracking and security enforcement (Step 114) capabilities. Current existing system relies on door locks and visual restrictions. The device 40 would collect data that would provide for a complete tracking means and a historic record of the traveled locations.

It is envisioned that an employee will wear (or carry) a device 40 that contains a GPS sensor 46 that will track the latitude, longitude and altitude of the individual, and that this device 40 will have the capacity to either store the collected data, or transmit the data (via, for example, radio frequency) to a host computer 14 that will collect and store the data. Once the data has been collected, it will be analyzed by a separate process to achieve the desired objective such as those described above.

What is claimed is:

1. A method of tracking movement of a moving object to track and determine productivity comprising the steps of:
   receiving a current position comprising longitude, latitude, and altitude of said object;
   obtaining data including the current position and activity of said object;
   repeating the receiving and obtaining steps for a period of time to create positional movements and the activities for said period of time;
   overlaying the positional movements and the activities on a two or three-dimensional map for said period of time;
   analyzing the positional movements and the activities of said map for said period of time; and
   determining the productivity of said object from the analyzed positional movements and the activities.

2. A method according to claim 1 wherein said object is comprised of an employee, equipment or vehicle.

3. A method according to claim 2 wherein:
   said data further includes time information and identification of said object.

4. A method according to claim 3 wherein said period of time is for a work day.

5. A method according to claim 4 wherein:
   the overlaying step further comprises the step of:
      recreating said positional movements of said object; and
   the determining step of further comprises the step of:
      determining productivity from the recreated movements.

6. A method according to claim 5 further comprising the steps of:
   security tracking of said object to determine whether during the activity said individual enters a non-required area;
   identifying security policies; and
   enforcing said policies.

7. A method according to claim 2 further comprising the steps of:
   determining repair/maintenance intervals of said equipment or said vehicle.

8. A method according to claim 1 further comprising the steps of:
   determining difficulty of the activities from the analyzed activities; and
   determining pay incentives.

9. A method according to claim 1 wherein the determining step further comprises the step of:
   determining non-productive movements.

10. A method according to claim 1 further comprising the steps of:
    assigning said object to a next task based on said current position.

11. A system configured to perform the method of claim 1.

12. A system for tracking movement of moving objects comprising:

a plurality of devices, each device being associated with a respective moving object the object comprising an employee, equipment or a vehicle, and adapted to receive a current position via a global positioning system (GPS) signal and transmit data including the current position and an activity of the object, further, the devices art selected from the set of a portable data terminal and a badge wherein said portable data terminal and said badge comprise a radio frequency transmitter to transmit the date and a positioning system receiver; and a host computer obtaining the data for a period of time to create positional movements and activities of said object for said period of time and overlaying the positional movements and the activities on a two or three dimensional map for said period of time for the basis of determining the productivity of said object from the positional movements and the activities.

13. The system according to claim 12 wherein:

said data further includes time information and identification of said object.

14. The system according to claim 13 wherein said period of time is for a work day.

* * * * *